2,910,343

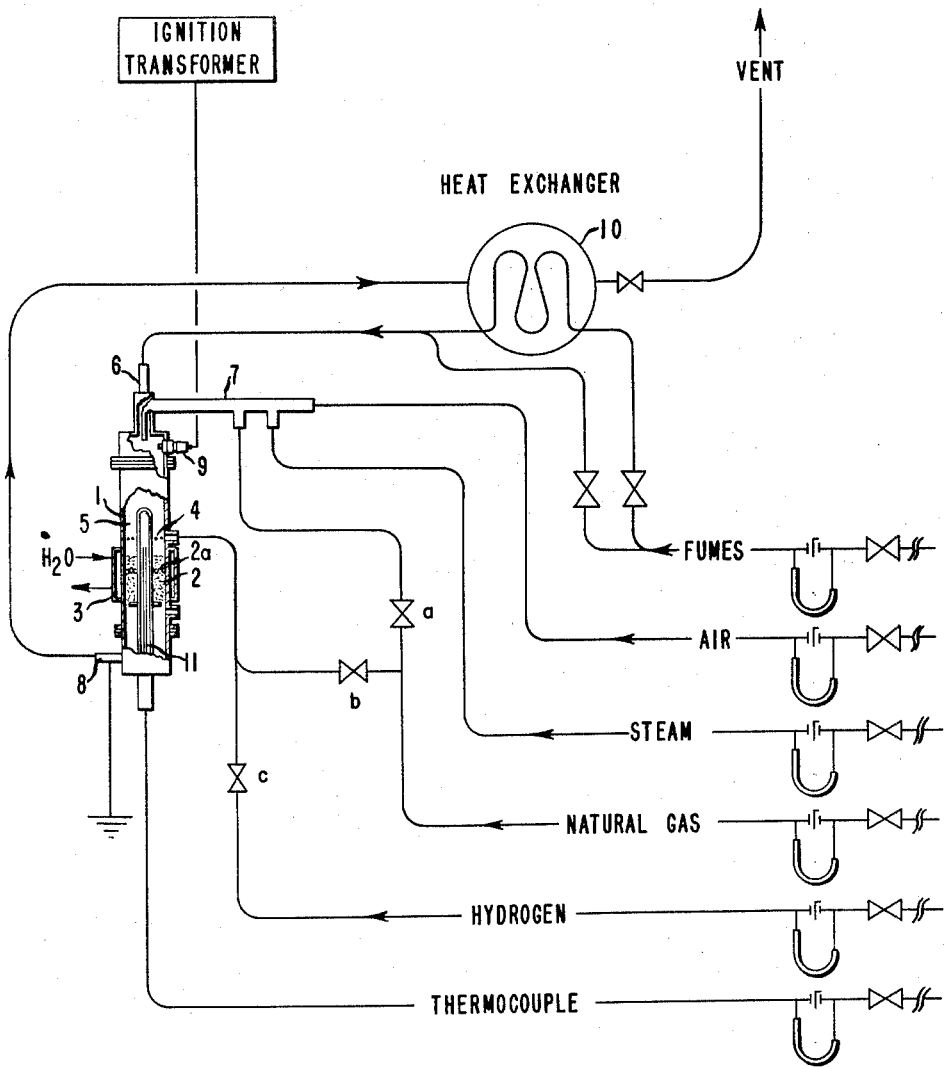

PROCESS FOR CATALYTICALLY REDUCING NITROGEN OXIDES IN INDUSTRIAL STACK GASES

Eugene Childers, South Charleston, W. Va., and Charles William Ellis and Donald James Ryan, Orange, Tex., assignors to E. I. du Pont de Nemours and Company, Wilmington, Del., a corporation of Delaware Application December 8, 1955, Serial No. 551,836

3 Claims. (Cl. 23—2)

The present invention relates to a process for the treatment of nocuous gases in order to permit their discharge into the atmosphere without danger to vegetable or animal life and more particularly relates to the reduction by catalysis of nitrogen oxides present in certain stack gases to nitrogen.

In carrying out certain chemical reactions, especially in working up oxidation and/or nitration mixtures which contain nitric acid in excess, such as those that occur in the nitric acid oxidation of cyclic alkanoes and cyclic alkanols, the oxidation products of which are, on occasion, further oxidized to monobasic and dibasic organic acids, considerable quantities of nitrogen gases ($NO_2$ and $NO$) are formed. Also, in the manufacture of nitric acid by ammonia oxidation considerable quantities of unabsorbed nitrogen gases ($NO_2$ and $NO$) are evolved. Owing to the risk of injury to vegetation and animal life and also the corrosiveness of such gases, they cannot safely be discharged directly into the atmosphere. Some form of treatment is necessary to reduce and preferably to eliminate entirely the nocuous components present in such gases.

Proposals have been made to absorb nitrogen oxide-containing gases in some effective absorption media thereby avoiding the necessity of discharging the gases into the atmosphere. An absorption plant to be effective must be of very large proportions requiring the use of considerable space and the expenditure of large sums for installation costs. The recovery of nitric acid, nitrous acid, or their salts is not usually balanced by the high installation cost, and this is particularly true in those operations in which the presence of nitric oxide, nitrogen dioxide and nitrogen tetraoxide, or complexes thereof, is 1 to 2% or less of the effluent gases. The need for a simple, inexpensive and effective method for rendering such gases innocuous is, therefore, self-evident.

An object of the invention is to reduce the nitrogen oxide content of an industrial stack gas to an innocuous level. Another object is to provide a process for reducing nitrogen oxides to nitrogen and water. A further object is to provide a process in which the nitrogen oxide content of stack gases and other effluent gases is reduced to harmless concentrations by catalytic reduction of these gases. Other objects and advantages of the invention will hereinafter appear.

The above and other objects are accomplished by subjecting stack gases, or other gases containing nitrogen oxides, to contact, at elevated temperatures and in the presence of a reducing gas with a highly effective catalyst for the reduction. The invention will be more readily understood by reference to the drawing which illustrates diagrammatically one form of apparatus in which the process of the invention may be carried out.

The reaction converter 1 is adapted and arranged to hold a mass of catalyst in a bed 2 divided into at least two compartments or layers with or without a separating gas permeable partition 2a. Above the catalyst bed 2, a gas sparger 4 is located in the gas inlet space 5. A major gas inlet 6, auxiliary gas inlet manifold 7, and treated gas exit 8 provide feed inlets and innocuous gas outlets from the converter 1. A spark plug 9 is placed in the inlet gas space 5 for igniting the heating gases. Heat exchanger 10 aids in maintaining a heat balance in the process but is not essential to the process. A thermocouple well 11 is placed in the catalyst bed 2 for temperature measurements.

The use of noble metal catalysts in the first compartment contacting the nocuous fumes permits lighting off the reaction at ambient temperatures or slightly higher, without the use of the preheating system.

Gas containing nitrogen oxides is treated in this manner. The converter 1 is charged with suitable catalysts which are disposed in bed 2. A natural gas-air mixture is fed through manifold 7, into the gas space 5, and ignited therein by a spark from spark plug 9. The resulting gas flame is passed through the catalyst bed 2 until the catalysts have attained the desired temperature for the reaction. When that temperature has been reached by preheating, as just described, or by direct light off at ambient temperatures, natural gas through sparger 4 and valves $a$ and/or $b$ (with or without hydrogen through valve $c$), nocuous gas through heat exchanger 10, and feed inlet 6, and a controlled amount of steam or nitrogen or other inert gases through manifold 7 are introduced into the converter 1. The air is turned off prior to the introduction of fumes and the temperature of the natural gas (or other gas or gaseous mixture used for reducing the fumes) and the reaction temperature are controlled by preheating the feed, or by regulating the amount of steam or nitrogen or other inert gas used as a cooling medium. The nitrogen oxide gases react in the catalyst bed 2 and the reaction products are discharged through heat exchanger 10 to a stack not shown. The stoichiometric reducing gas requirements are based on the following equations:

(1) $CH_4 + 4NO \rightarrow CO_2 + 2N_2 + 2H_2O$
(2) $H_2 + NO \rightarrow H_2O + \frac{1}{2} N_2$ The reaction is conducted at a temperature of the catalyst bed 2 between 100° C. and 1000° C., and for preferred catalysts between 500° C. and 1000° C. depending on the composition of the reducing gas. Pressure is generally used to the extent of 0.5 p.s.i. or higher in the inlet gas space to provide an adequate flow of gases through the catalyst bed. Higher or lower pressures may be used, however. For example, higher pressures would be desirable where power recovery is used. The amount of low temperature steam or other inert gas used is regulated to maintain the temperature within the range that is most effective for the particular catalyst.

The amount of reducing gas introduced can be in excess of that necessary to convert stoichiometrically the nitrogen oxides of the nocuous gas and/or other reducible compounds to nitrogen and water or other relatively non-toxic reduction products. Natural gas, methane alone, or other alkane-containing gas with or without hydrogen may be used such as ethane, propane, butane, etc., or mixtures thereof, or if desired, any hydrocarbon gas of the oil or coke oven industry. Hydrogen may be used alone with the dual catalyst of the invention, or hydrogen may also be used containing up to 60% by volume of natural gas. If hydrogen is used alone or is used with the alkane-containing gas, to the extent of at least 40% of the stoichiometric amount necessary to reduce the fumes, the reaction will light off spontaneously without the necessity of preheating the catalyst bed.

The gas flow, after the preheating operation, should range between 25,000 and 150,000 reciprocal hours or more (i.e. 25,000 to 150,000 S.V. the number of cubic feet (SPT) of nocuous gas flowing per hour over one cubic foot of catalyst).

Catalyst requirements for complete nitrogen fume abatement are quite critical, for catalytic reduction alone The table given below illustrates the effectiveness of the invention in the treatment of fumes containing 0–15% $O_2$; 0–20% $N_2O$; 0–1.5% $NO_2$, acid producing oxides of nitrogen; and 63–99% $N_2$.

Table

| Catalyst | | Bed Temperature, °C. | Fume Rate, s.c.f.h. | Hydrogen Rate, s.c.f.h. | Nat. Gas Rate, s.c.f.h. | Oxides Leakage, p.p.m. | HCN Leakage, p.p.m. |
|---|---|---|---|---|---|---|---|
| 1st Bed | 2nd Bed | #1 | #1 | | | | |
| None | 7″ 0.5% Platinum on Alumina. | | 725 | 10,970 | 906 | 550 | 8 | 200 |
| Do | 4″ 0.5% Platinum on Alumina. | | 595 | 22,620 | 4,890 | 0 | 10 | 28 |
| 2″ 0.5% Platinum on Alumina. | 6″ Nickel Aluminate | 540 | 635 | 22,700 | 4,880 | 0 | 5 | 7 |
| 3″ 0.5% Platinum on Alumina. | do | 675 | 725 | 13,720 | 1,730 | 0 | 85 | 17 |
| ½″ 0.5% Platinum on Alumina. | do | 615 | 755 | 17,930 | 555 | 780 | 50 | 5 |
| Do | 6″ Copper Impregnated Alumina. | 625 | 735 | 17,930 | 1,390 | 764 | 50 | 4 | does not reduce, to a sufficiently low level, toxicity due to nocuous gases which were present in the fumes prior to the catalysis or which are frequently formed during reduction in the presence of an ineffective catalyst for the reaction. It has been found during research on the process of the invention, that hydrogen cyanide is sometimes formed, in consequential amounts, during the first reduction stage of the process when certain highly active noble metal catalysts are used and the reduction is conducted in a thick bed of such catalysts. On the other hand, by the use of a composite catalyst in which the fumes are passed with a reducing gas first through a catalyst bed containing a relatively small amount of highly active noble metal reducing catalysts, as, for example, a thin bed of such catalyst, and then through a catalyst bed containing a less active reducing or reforming catalyst, effective removal of nocuous gases is accomplished with essentially no formation of hydrogen cyanide.

Any type of noble metal supported or unsupported catalyst may be used in the first bed, i.e., the bed in which the nocuous fumes first contact the catalyst. These catalysts may be in the form of gauze, mats, or the like, or may be supported on alumina or any other type of suitable inert catalyst support such as infusorial earth, kieselguhr etc. Platinum, rhodium, or palladium, or mixtures of any two or more noble metals, are used for the principal catalyst of this bed although any other similar type of highly active reduction catalyst may be used.

For the second catalyst bed, such catalysts are employed as nickel-supported on activated alumina, copper chromite, fused metal oxide catalysts such as are described in the A. T. Larson U.S. Patent 2,061,470. The preferred catalyst for this secondary catalysis is a nickel on alumina catalyst prepared by precipitating basic nickel carbonate with ammonium carbonate or bicarbonate on finely divided alumina hydrate of about 10 mesh U.S. standard screen size by a process similar to that described in the A. B. Stiles U.S. Patent 2,570,882. The resulting precipitate is dried and calcined to reduce the metal salts to their oxides and the mixture of nickel and alumina then thoroughly mixed with up to about 5% of a volatilizable lubricant such as a high melting wax, the resulting product pelleted, the lubricant removed by heating to a temperature of 500° C. in the presence of oxygen and the pellets finally heated to 1050° C. or thereabouts, to harden by sintering.

Reforming catalysts may likewise be used in the second catalyst bed to insure clean-up of the fumes or nocuous gases produced in the first catalyst bed. Examples of such catalysts are the nickel promoted catalysts, such as those described in the Roger Williams U.S. Patent 2,119,565, the catalysts of the John C. Woodhouse U.S. Patent 2,064,867, and like catalysts.

The invention described is adaptable for the treatment of nitrogen-oxide-containing gases from any source and is for use particularly in localities where undue air pollution is to be avoided. The reduction of nitric oxide fumes resulting from the oxidation and nitration of organic compounds and nitric fumes resulting from the manufacture of nitric acid have been successfully accomplished by the technique described herein to give an effluent gas containing no detectable quantities of nitrogen oxide fumes or of hydrogen cyanide.

What is claimed is:

1. In a process for the disposal of a stack gas containing nitrogen oxide fumes in order to produce a stack gas which is substantially free from nitrogen oxides and hydrogen cyanide and can be discharged safely into the atmosphere without any detrimental effect on the environment, the steps which comprise adding a reducing gas to a nocuous gas containing a nitrogen oxide, passing the resulting gaseous mixture at a space velocity of at least 25,000 reciprocal hours, SPT per cubic foot of catalyst over a platinum on alumina catalyst and thereafter over a nickel catalyst supported on alumina at a temperature of 100° C. to 1000° C., the noble catalyst being disposed in a bed having a depth less than about one-half the depth of the nickel on alumina bed, controlling the temperature and thereby reducing the nitrogen oxide to nitrogen and finally discharging the resulting effluent gas into the atmosphere.

2. In a process for the disposal of a gaseous mixture containing an inert gas and nitrogen oxide fumes, in order to produce a waste gas which is sufficiently reduced in nitrogen oxides and hydrogen cyanide, the latter being a product of the reduction, to be discharged safely into the atmosphere without any detrimental effect on the environment, the steps which comprise passing a nocuous gas containing nitrogen oxides and between 63% and 99% nitrogen and a reducing gas of the group consisting of hydrogen and alkanes, at a temperature between 500° C. and 1000° C., at a space velocity of at least 25,000 reciprocal hours SPT per cubic foot of catalyst, first over a bed of a platinum catalyst and then over a catalyst bed containing a catalyst of the group consisting of reforming catalysts and hydrogenation catalysts, the platinum catalyst bed having 1/12 to ½ the thickness of the catalyst bed of the group, whereby the nitrogen oxide content of the gas is reduced to innocuous amounts and the effluent gas is free from nocuous quantities of hydrogen cyanide, and discharging the resulting waste gas into the atmosphere.

3. In a process for the disposal of a gaseous mixture containing an inert gas and nitrogen oxide fumes, in order to produce a waste gas which is sufficiently reduced in nitrogen oxides and hydrogen cyanide, the latter being a product of the reduction, to be discharged safely into the atmosphere without any detrimental effect on the environment, the steps which comprise passing fumes containing nocuous amounts of nitrogen oxides and more than 63% nitrogen and a reducing gas containing hydrogen and up to 60% by volume of natural gas, in a ratio of 1335 to 1730 s.c.f.h. reducing gas and 13,720 to 22,700 s.c.f.h. fumes, at a space velocity of at least 25,000 reciprocal hours, SPT per hour per cubic foot of catalyst, at a temperature between 540° C. and 755° C., first over an 0.5% platinum catalyst on alumina and then over a nickel catalyst supported on activated alumina, the platinum on alumina bed having $1/12$ to $1/2$ the thickness of the nickel on alumina bed, whereby the nitrogen oxide content of the gas is reduced to innocuous amounts and the effluent gas is free from nocuous quantities of hydrogen cyanide, and discharging the resulting waste gas into the atmosphere.

References Cited in the file of this patent

UNITED STATES PATENTS

| | | |
|---|---|---|
| 1,962,485 | Dely | June 12, 1934 |

FOREIGN PATENTS

| | | |
|---|---|---|
| 476,684 | Great Britain | Dec. 13, 1937 |
| 693,775 | Great Britain | July 8, 1953 |

OTHER REFERENCES

Mellor: "Comprehensive Treatise on Inorganic and Theoretical Chemistry," Longmans, Green and Co., New York, vol. 8, 1928, pp. 396.

Rideal and Taylor: "Catalysis in Theory and Practice," The MacMillan Company, New York, 2nd ed., 1926, pp. 246.

UNITED STATES PATENT OFFICE
CERTIFICATE OF CORRECTION

Patent No. 2,910,343

October 27, 1959

Eugene Childers et al

It is hereby certified that error appears in the printed specification of the above numbered patent requiring correction and that the said Letters Patent should read as corrected below.

Column 1, line 24, for "alkanoes" read -- alkanones --; columns 3 and 4, in the table, the sub-heading of second column under the main heading "Bed Temperature, °C." for "#1" read -- #2 --.

Signed and sealed this 12th day of April 1960.

(SEAL)
Attest:

KARL H. AXLINE
Attesting Officer

ROBERT C. WATSON
Commissioner of Patents